May 1, 1923.                                                          1,453,388
C. LE. G. FORTESCUE
ELECTROLYTIC CONDENSER
Filed Nov. 3, 1919
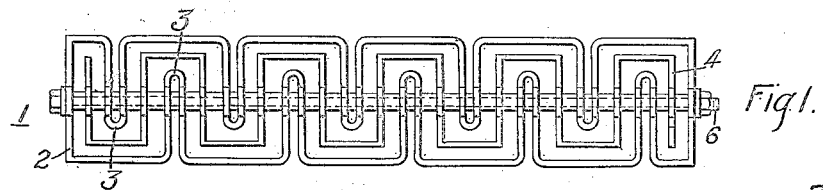
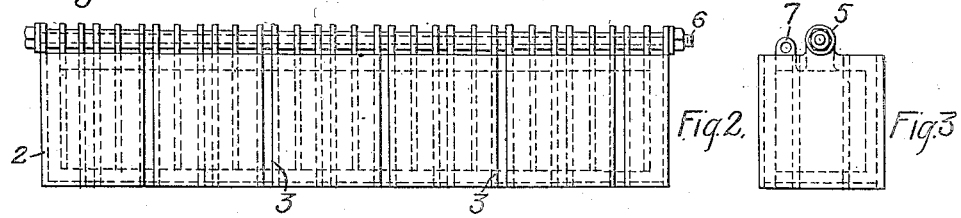
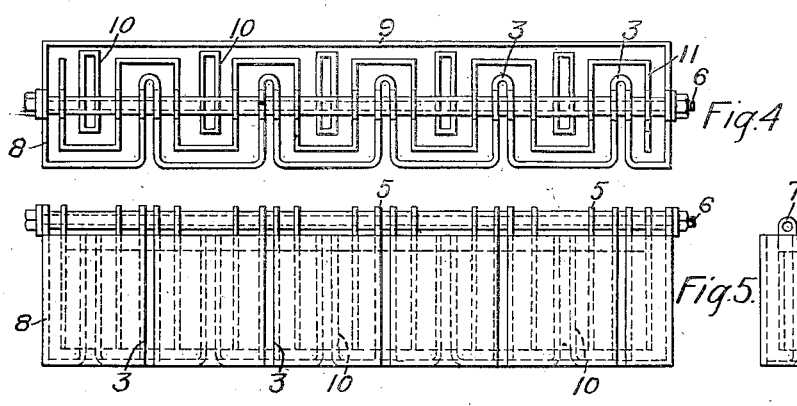
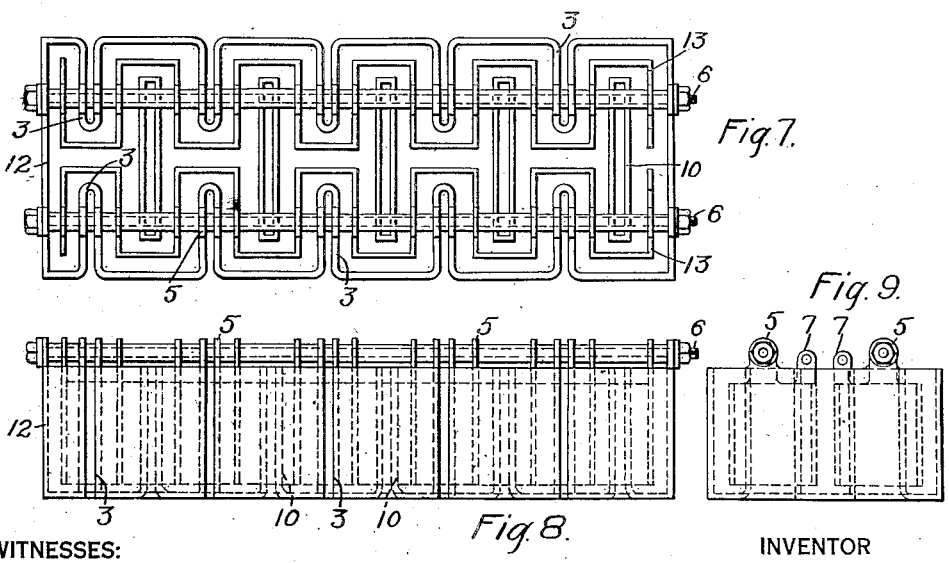
WITNESSES:
INVENTOR
Charles Le G. Fortescue.
BY
ATTORNEY Patented May 1, 1923.

1,453,388

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTROLYTIC CONDENSER.

Application filed November 3, 1919. Serial No. 335,426.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Electrolytic Condensers, of which the following is a specification.

My invention relates to electrolytic cells, such as condensers, rectifiers, lightning arresters and the like, and it has, for its object, to provide a form of construction for cells of the character indicated which shall be strong and rigid and which shall have desirable electrical characteristics.

One object of my invention is to provide electrolytic cells of such construction as to ensure a maximum area of heat radiation which shall tend to maintain the cells at a desirable operating temperature.

A still further object of my invention is to construct electrolytic cells in such manner as to utilize exceptionally large active plate areas within a minimum space.

With these and other objects in view, my invention will be more fully described, illustrated in the drawings, in the several views of which corresponding numerals indicate like parts, and then particularly pointed out in the claims.

In the drawings, Fig. 1 is a plan view of an electrolytic cell constructed in accordance with my invention; Fig. 2 is a side elevation of the cell shown in Fig. 1; Fig. 3 is an end elevation of the cell shown in the previous figures; Fig. 4 is a plan view of a modified form of electrolytic cell embodying my invention; Figs. 5 and 6 are side and end elevations, respectively, of the cell shown in Fig. 4; Fig. 7 is a plan view of a double-unit cell embodying my invention, and Figs. 8 and 9 are side and end elevations, respectively, of the cell shown in Fig. 7.

In practising my invention, I may construct an electrolytic cell by employing a casing, which may be formed of either electrolytically active or inactive material and an electrode or plate of suitable shape to fit within the casing. The casing may be formed with flexed sides and acts as an electrolyte container. If it is of a film-forming material, it acts also as one of the electrodes, the plate disposed within the casing comprising the other electrode. The plate and casing may have suitable projections provided with openings through which an insulated fastening member may be disposed to maintain the plate or electrode in place within the casing.

In Fig. 1 is shown one form of an electrolytic cell 1 embodying my invention. The cell 1 comprises a casing 2 which is preferably formed with flexed sides to provide the inwardly extending portions 3 which are substantially parallel, and those at one side being formed in alternate relation with respect to those at the opposite side. The casing 2 may be formed of a material which is inert with respect to the electrolyte or it may be formed of suitable film-forming material, such as tantalum, magnesium, aluminum, or other filming metal, or the casing may be formed of a plurality of materials in such manner as to have a film-forming material as the inner wall of the casing and a non-film-forming material as the outer wall thereof. A suitable electrode 4, formed of aluminum or other film-forming material, may be so flexed as to fit within the casing in spaced relation with respect to the walls thereof. Both the casing 2 and the electrode 4 may have projecting portions 5 provided with suitable openings to receive an insulated bolt 6 which may be employed to maintain the electrode 4 in position.

The casing 2 is, of course, so formed that it will retain an electrolyte disposed therein and, if the casing is made of a film-forming material, a complete cell is thus provided. However, if the casing 2 is formed of non-film-forming material, a plurality of such units may be employed to provide a condenser, rectifier, or the like. The electrode 4 may be provided with a suitable terminal, such as indicated at 7, to facilitate securing conductors thereto. It will be appreciated from the foregoing description of the cell shown in Figs. 1 to 3 inclusive, that a large heat-radiating surface is provided by employing the casing 2 having flexed side walls. Furthermore, by employing an electrode conforming to the shape of the walls, the space within the container is economically utilized with regard to plate area.

In Figs. 4 to 6, inclusive, is shown a modified form of electrolytic cell in which a casing 8 is employed having one straight side 9 and a flexed side 3. The casing 8 is also formed with a bottom through which open tubular portions 10 extend upwardly through the cell to provide air passages for cooling purposes. An electrode 11, which corresponds to the electrode 4 shown in the previous figures, is employed to fit within the casing 8 in spaced relation both with respect to the casing walls and to the tubes 10 extending from the bottom of the casing. The projecting portions 5 are utilized to permit of employing the bolt 6 to maintain the electrode 11 in position in the casing 8.

The casing of the cell above described may be formed of material or materials of the same character as the casing of the cell shown in Figs. 1 to 3. Obviously, if the casing is of non-film forming material, a plurality of such units must be employed to provide a condenser or the like, as above mentioned.

In Figs. 7 to 9, inclusive, is shown a cell which is substantially a combination of the two cells previously described. For example, a casing 12 is employed which is formed with flexed sides, but, in this instance, the inwardly extending portions 3 of one side may be formed substantially opposite the corresponding portions of the other side of the casing. Upwardly extending tubular portions 10, similar to those shown in the cell of Figs. 4 to 6, inclusive, may also be employed, in this instance, to provide greater heat-radiating or cooling surfaces. The air passages or tubes 10 are particularly desirable with the casing 12 since, because of its greater width, it must necessarily have greater cooling surfaces. A plurality of electrodes 13, which are similar to the electrodes 4 and 11 previously described, may be employed to fit within the casing 12 at each side, in spaced relation to its upwardly extending tubular portions 10 and the inwardly extending side portions 3. The fastening supports 5 may be employed to receive a plurality of the bolts 6 to maintain the electrodes 13 in correct spaced position with respect to the casing 12. A terminal 7 is also formed upon each of the electrodes 13 to provide means for securing conductors thereto.

The casing of the cell, shown in Figs. 7 to 9, inclusive, is designed to act as an electrolyte container and as a means for supporting the active electrodes 13 in the electrolyte and is not made of film-forming material. It will be appreciated that an exceptionally large heat-radiating surface is provided without decreasing the active-electrode-plate area which may be employed in the available space.

It will be appreciated that my invention broadly comprises the provision of an electrolyte cell including a casing which is formed with a serpentine casing to provide suitable air passages and, consequently, large heat radiating surfaces. The particular construction of the casing ensures efficient operation of the cell because the temperature of the electrolyte may be maintained at a desirable value.

Although I have shown and specifically described a plurality of electrolytic cells of particular construction, it is obvious that minor changes may be made in the construction thereof without departing from the spirit or scope of my invention, and I desire, therefore, that no limitations shall be imposed except such as are indicated in the appended claims.

I claim as my invention:—

1. An electrolytic cell comprising a casing formed with curved side walls and upwardly extending, tubular bottom portions, an electrolyte disposed therein, a plurality of film-forming electrodes of corresponding shape immersed in the electrolyte and disposed in spaced relation with respect to each other and to the casing and means for maintaining the electrodes in position.

2. An electrolytic cell comprising a casing having a serpentine bottom, side walls of corresponding contour united with said bottom, an electrolyte disposed therein and an electrode immersed in the electrolyte and maintained in spaced relation with respect to the casing.

3. An electrolytic cell comprising a casing containing an electrolyte and having an air duct opening at its ends above the electrolyte and through the bottom of the casing and an electrode within the casing and spaced from both the casing and duct.

4. An electrolytic cell comprising a casing containing an electrolyte and having air ducts opening at their ends above the electrolyte and through the bottom of the casing and electrodes within the casing and spaced from each other and from both the casing and the ducts.

In testimony whereof, I have hereunto subscribed my name this 16th day of Oct., 1919.

CHARLES LE G. FORTESCUE.